March 6, 1934.    A. JACKSON ET AL    1,949,719

LIFT

Filed Nov. 23, 1931    2 Sheets-Sheet 1

INVENTORS
ALEXIS JACKSON
OSCAR L. TENNANT
BY Bruce and Bialer
ATTORNEYS.

March 6, 1934.  A. JACKSON ET AL  1,949,719
LIFT
Filed Nov. 23, 1931    2 Sheets-Sheet 2

INVENTORS
ALEXIS JACKSON
OSCAR L. TENNANT.
BY *Bruce and Bialos*
ATTORNEYS.

Patented Mar. 6, 1934

1,949,719

UNITED STATES PATENT OFFICE 1,949,719

.LIFT

Alexis Jackson and Oscar L. Tennant, San Francisco, Calif., assignors to Tennant Hi-Jack Company, Inc., San Francisco, Calif., a corporation of California Application November 23, 1931, Serial No. 576,700

18 Claims. (Cl. 254—3)

Our invention relates to lifts, and particularly to a portable lift capable of being operated by fluid pressure and of the type disclosed in our copending application, Serial No. 561,570, filed September 8, 1931. The invention in this application is for improvements over the lift disclosed in our earlier filed application.

An important object of our invention is the provision of a lift, which can be used around garages for lifting the ends of vehicles, such as automobiles, and which can be operated by pneumatic pressure obtained from a source commonly employed for inflating automobile tires.

Another object of our invention is the provision of a lift, which is light and readily portable, so that it can be moved about from place to place.

Another object of our invention is the provision of a lift, which is composed of few and simple parts, and which can be economically manufactured.

Another object of our invention is to provide a lift, of the character described, which is stable under a load, regardless of unevenness of the floor upon which the lift may rest.

Another object of our invention is the provision, in a pneumatic lift of the character described, of means independent of the pneumatic means for supporting the lift under a load.

An additional object of our invention is the provision of supporting means, particularly adapted for holding the front or rear axle of a vehicle, such as an automobile, with facility and stability.

A further object of our invention is to mount the supporting means in such manner, whereby it may readily move to positions which the vehicle, as it is being lifted, causes it to assume.

Additional objects and advantages of our invention will be apparent from a perusal of the following description forming part of the specification.

Referring to the drawings.

Figure 1:
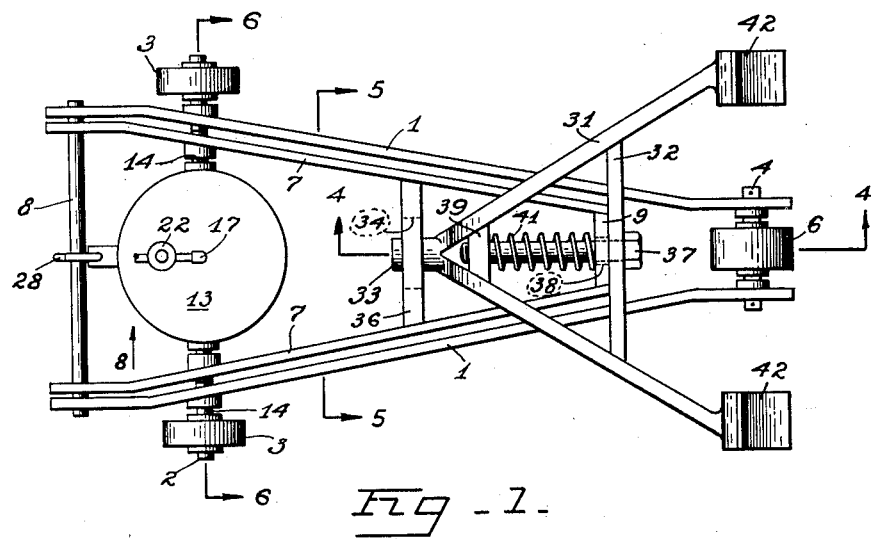
Figure 1 is a top plan view of the lift of our invention, showing the lifting arm in lowered position.
Figure 2:
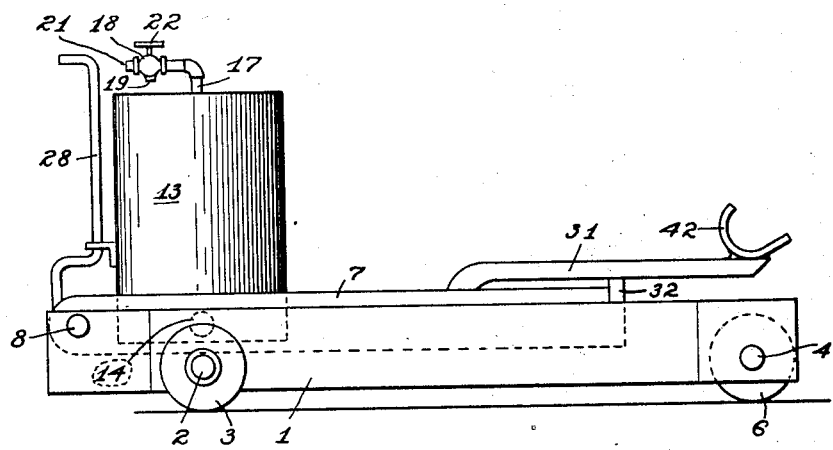
Figure 2 is a side elevational view of the lift, illustrated in Figure 1.
Figure 3:
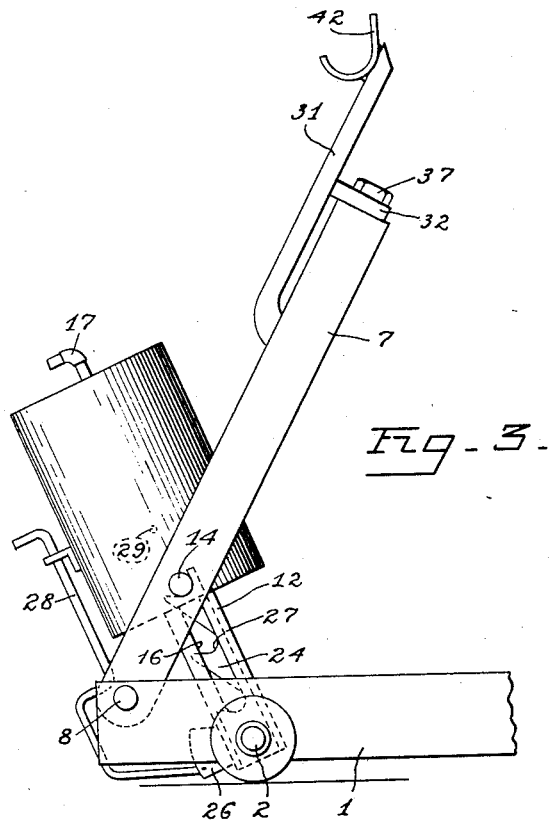
Figure 3 is a fragmentary side elevational view of the lift, illustrating the lifting arm in an elevated position.
Figure 6:
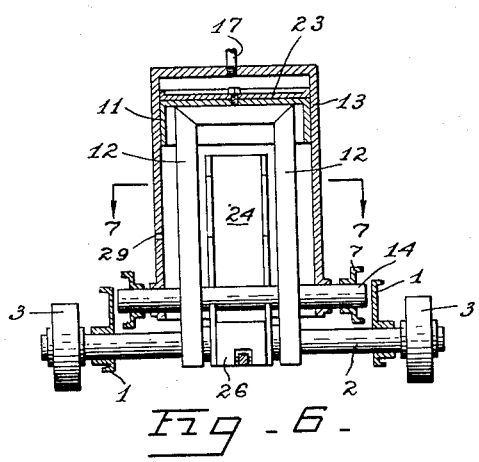
Figure 6 is a vertical sectional view, partly in elevation, taken in a plane indicated by line 6—6 of Figure 1.
Figure 4:
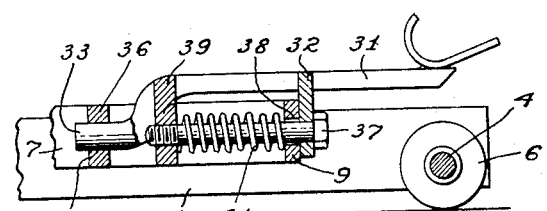
Figure 4 is a vertical sectional view, partly in elevation, taken in a plane indicated by line 4—4 of Figure 1.
Figure 7:
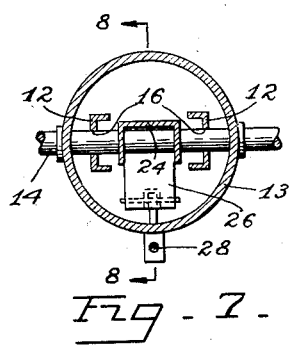
Figure 7 is a horizontal sectional view, taken in a plane indicated by line 7—7 of Figure 6.
Figure 8:
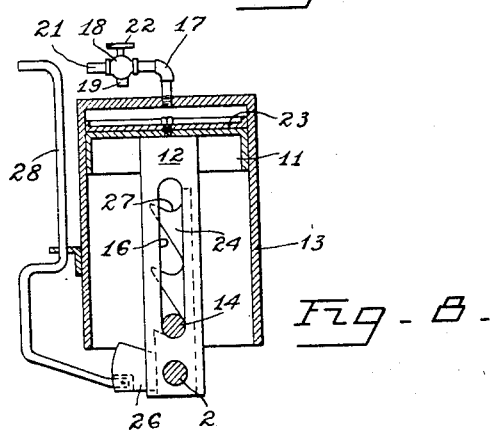
Figure 8 is a sectional view of the cylinder and piston construction, taken in a plane indicated by line 8—8 of Figure 7.
Figure 5:
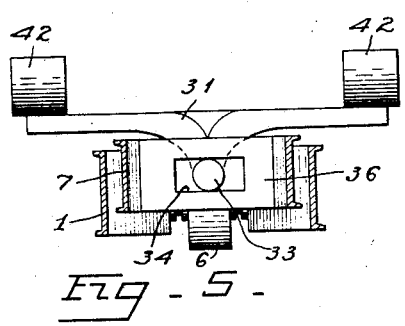
Figure 5 is a vertical sectional view taken in a plane indicated by line 5—5 of Figure 1.

Broadly, the lift of our invention comprises a carriage upon which is movably mounted a lifting arm to effect elevation of the object lifted. Fluid operable means, including a piston and cylinder mounted for relative sliding movement, is connected to the arm and carriage to cause elevation of the arm upon application of fluid pressure, such as air pressure. Means, independent of the fluid operable means, is preferably provided for supporting the arm in elevated position upon movement thereof. The carriage or frame is preferably of triangular shape to provide three points of support therefor upon the floor. This lends stability to the structure when the lifting arm is elevated under a load, particularly if the floor upon which the carriage rests happens to be rough or wavey, as frequently occurs with respect to cement or concrete garage floors.

Since our lift is applicable for elevating the ends of automobiles, we employ at the free end of the lifting arm means particularly adapted for supporting the vehicle on its axle. This means preferably comprises a support which is mounted for movement in such manner relative to the arm, so that the support may shift to positions which the vehicle, as it is being lifted, causes it to assume, thus reducing to a minimum stresses upon the apparatus. Preferably, the support is forked, so that it can hold the axle at two spaced points; and the ends of the support are provided with curved brackets for securely holding the vehicle axle in any position of elevation.

With reference to the preferred embodiment of our invention, our lift comprises a carriage of triangular shape including the spaced frame members 1. Adjacent the rear end of the carriage is mounted an axle 2, extending transversely across the frame members, and upon the ends of which are journaled the rollers 3. The front ends of frame members 1 converge and are connected by the axle 4, upon which is journaled the roller 6 positioned between the frame members 1 and midway between the pair of rollers 3. Pivotally connected to the carriage, adjacent the rear end thereof and between the frame members 1, are the lifting arms 7, mounted on the rod 8 which is journaled on the carriage. The lifting arms also converge toward the front of the carriage, and are joined together, at their free ends, by the bar 9.

Means (preferably pneumatic, which is most convenient and economical due to the common presence thereof in garages and service stations where our device finds great applicability) is provided for elevating the lifting arm to any desired position. This means comprises a piston 11, on the under side of which are secured the spaced channel bars 12. The lower ends of bars 12 are journaled on the axle 2 to allow pivotal or rocking movement of the piston on the carriage. Slidable on the piston is a cylinder 13 mounted on the pin 14, which extends through the elongated slots 16 in the side walls of bars 12. The pin 14 is journaled in the lifting arms 7, thus allowing rocking or pivotal movement of the cylinder relative to the lifting arm, when fluid pressure is applied to the piston to effect elevation of the lifting arm. It is apparent that pin 14 cooperates with the upper ends of slots 16 to limit upward movement of cylinder 13; and the slots are of such length as to prevent the lifting arm being elevated above dead center, thus permitting ready lowering of the lifting arm under a load when so desired. Since pin 14 extends all the way through the cylinder 13 and contacts with the side walls of slots 16, the pin will act to reinforce the structure against torsional stresses which might be imposed by a heavy load upon the lifting arm.

The means for allowing introduction of air under pressure into the cylinder to cause movement thereof and consequent elevation of the lifting arm, comprises the pipe 17 connected to the upper portion thereof. A two way valve 18 having the air inlet 19 and the outlet 21 is positioned in the pipe 17. The inlet 19 is preferably of the type commonly employed on automobile tires, so that air lines generally in garages and similar places may be applied thereto to cause elevation of the lifting arm. By turning the handle 22 of the outlet 21, air pressure in the cylinder can be reduced to cause lowering of the lifting arm after it has been elevated. A friction washer 23, of leather or similar material, is mounted upon the end of piston 11, to make the structure air tight.

Although air under pressure in the cylinder will hold the lift in elevated position under a load, we prefer to employ additional means for supporting the lifting arm in elevated position. This will reduce stresses on the apparatus and serve as a protection to workmen, who might be working underneath a vehicle which is held in elevated position by the lift. This means preferably comprises a ratchet 24 mounted for pivotal and rocking motion on the carriage, and journaled on the axle 2; the ratchet being positioned between the bars 12. Means, comprising the counter-weight 26 at the bottom of the ratchet, is provided for urging it in the direction of movement of the lifting arm, piston, and cylinder, so that the pin 14 may automatically rest in the notches 27 of the ratchet, as the lifting arm is being elevated.

It is thus seen that after the lifting arm has been elevated by the fluid operable means, it may be entirely supported in elevated position by the ratchet mechanism described; and air can be let out of the cylinder to allow for such supporting of the lifting arm. When it is desired to lower the lifting arm, air can be introduced into the cylinder to raise the pin 14 off the notch upon which it rests; and the ratchet can be swung away by means of pulling upwardly on handle 28, pivotally connected to the bottom of the ratchet. Air can then be slowly let out of the cylinder, to permit lowering of the lifting arm, under the cushioning action of the escaping air in the cylinder.

For the purpose of providing automatic supporting of the lifting arm in its uppermost position, by the ratchet, thus making it unnecessary to release air through the valve, we provide an aperture 29 in the wall of cylinder 13. The aperture is positioned near the bottom of the cylinder so that it is uncovered by piston 11, to allow escape of air from the cylinder, when the pin 14 has been moved to a position wherein it can rest in the upper notch 27 of the ratchet. Aperture 29 should be sufficiently small to permit enough air pressure in the cylinder, when air is again introduced to allow swinging away of the ratchet and consequent lowering of the lift, in the manner previously described.

Adjacent the free end of the lifting arm, we preferably employ a supporting structure which is particularly adapted for holding the axle of an automobile to be lifted. The support extends transversely of the arm and comprises the V-shaped frame 31 having the transverse cross bar 32, positioned against the front end of the lifting arm formed by the bar 9. The end of the V is turned downwardly and terminates in a stud 33, which fits in a laterally elongated slot 34 formed in the cross bar 36, secured between the lifting arm members 7. A bolt or stud 37 passes through an aperture in the cross bar 32 of the support and through an aperture 38 in the bar 9 of the lifting arm, and is threaded in the cross bar 39 secured to the frame 31.

The stud 37 is journaled in the aperture 38 of the lifting arm to allow rocking motion of the support, with the stud as a pivot; and the aperture 38 is of slightly greater diameter than the diameter of the stud 37, so as to permit transverse movement or sidewise play of the support relative to the lifting arm. By this construction, it is seen that if the tires of a vehicle happen to be unevenly inflated or if the carriage is not mounted on a level floor, the ends of the support may readily accommodate themselves to such conditions upon lifting of a vehicle. Furthermore, since a vehicle when being lifted at one end tends to sway laterally about the other end as a pivot, the transverse movement of the support will allow it to accommodate itself to such swaying, thus reducing strain upon the apparatus. During such movements of the support, the bar 36 (in the elongated slot 34 of which stud 33 of the support is mounted) will act as a guide means, and will also provide an additional mounting means for holding the support when an object is being lifted.

For the purpose of holding the support in normal position on the lifting arm, we preferably employ yieldable means (such as spring 41 surrounding stud 37 and interposed between the lifting arm and supporting frame 31) for resisting movement of the support relative to the arm. At the ends of the V-shaped or forked supporting frame 31, we preferably mount curved brackets 42, which are particularly adapted for holding the axle of a vehicle at two spaced positions. The brackets will allow sliding of the axle therein, as the vehicle is being lifted, and thereby provide a firm support regardless of the degree of elevation of the vehicle.

From the preceding description, it is seen that we have provided a lift which is simple in construction and economical to manufacture. Its portability enables it to be moved about readily from place to place, as may be necessary; and for this purpose, the lift may be provided with a handle (not shown) connected thereto at any convenient point, if so desired. It is also apparent that any suitable material, preferably steel or a similar metal, can be employed for making the device. Although we have described the lift, with respect to the preferred embodiment, as being particularly adapted for elevating automobiles, it is apparent that it can be employed for elevating other devices and in other forms, within the scope of the following which we claim as our invention.

We claim:

1. A lift comprising a carriage, a lifting arm pivotally connected to said carriage, a piston mounted for rocking movement on said carriage, a cylinder slidable on said piston and movably connected adjacent the lower end thereof to said arm so that the head of said piston is above said arm, means whereby movement of said cylinder on the piston can be effected by fluid pressure to elevate said arm, and a ratchet mechanism mounted on said carriage for supporting said arm in elevated position.

2. A portable pneumatic lift comprising a movably mounted carriage, a lifting arm pivotally connected to said carriage, a piston, means including a supporting wall connected to said piston for mounting the piston for rocking movement on said carriage, said wall having a slot therein, a pin mounted on said arm and extending through said slot, a cylinder mounted on said pin and slidable on said piston, said cylinder being movable relative to the arm, means whereby movement of said cylinder on the piston can be effected by fluid pressure to elevate said arm, and a ratchet pivotally connected to said carriage for supporting said arm in elevated position.

3. A portable pneumatic lift comprising a movably mounted carriage, a lifting arm pivotally connected to said carriage, a piston, means including a supporting wall connected to said piston for mounting the piston for rocking movement on said carriage, said wall having a slot therein, a pin mounted on said arm and extending through said slot, a cylinder mounted on said pin and slidable on said piston said cylinder being movable relative to the arm, means whereby movement of said cylinder on the piston can be effected by fluid pressure to elevate said arm, a ratchet pivotally connected to said carriage for supporting said arm in elevated position, and means for urging the ratchet in the direction of movement of said arm.

4. A lift comprising a carriage, a lifting arm movably connected to said carriage, a support for the object to be lifted positioned adjacent the free end of said arm, means for mounting said support for transverse and rocking movement relative to said arm, and means for elevating said arm.

5. A lift comprising a carriage, a lifting arm movably connected to said carriage, a support for the object to be lifted positioned adjacent the free end of said arm, means for mounting said support for transverse and rocking movement relative to said arm, yieldable means for resisting movement of said support relative to the arm, and means for elevating the arm.

6. A lift comprising a carriage, a lifting arm movably connected to said carriage, a support for the object to be lifted positioned adjacent the free end of said arm, a stud passing through apertures in the support and arm for holding the support on the arm, the aperture in the arm being sufficiently large to allow movement of the support relative to the arm, and means for elevating the arm.

7. A lift comprising a carriage, a lifting arm movably connected to said carriage, a support for the object to be lifted positioned adjacent the free end of said arm, a stud passing through apertures in the support and arm for holding the support on the arm, the aperture in the arm being sufficiently large to allow movement of the support relative to the arm, a spring surrounding said stud for resisting movement of said support relative to the arm, and means for elevating the arm.

8. A lift comprising a carriage, a lifting arm movably connected to said carriage, a support for the object to be lifted positioned adjacent the free end of said arm, a stud passing through apertures in the support and arm for holding the support on the arm, the aperture in the arm being sufficiently large to allow movement of the support relative to the arm, yieldable means for resisting movement of said support relative to the arm, mounting means for guiding the support in such movement, and means for elevating the arm.

9. A lift comprising a carriage, a lifting arm pivotally connected to said carriage, a support for the object to be lifted positioned adjacent the free end of said arm and extending transversely thereof, a pair of brackets for holding the object to be lifted and positioned adjacent the ends of said support, means for mounting said support for transverse movement relative to said arm, and means for elevating the arm.

10. A portable lift comprising a movably mounted carriage, a lifting arm pivotally connected to said carriage, a support for the object to be lifted positioned adjacent the free end of said arm and extending transversely thereof, a pair of curved brackets adapted to hold the object lifted in secure position regardless of the position of said arm, said brackets being mounted adjacent the ends of said support, means for mounting the support for transverse movement relative to said arm, and pneumatic means interposed between the free end of said arm and its pivot for elevating the arm.

11. A vehicle lift for elevating an end of a vehicle comprising a carriage, a lifting arm movably connected to said carriage, a support for the vehicle to be lifted positioned adjacent the free end of said arm, said support being provided with spaced holding means for engaging said vehicle, means for mounting said support for movement relative to the lifting arm to positions to which the vehicle urges it under forces exerted upon lifting of the vehicle, and means for elevating said arm to effect lifting of the vehicle.

12. A lift comprising a carriage, a lifting arm movably connected to said carriage, a piston, means including a supporting wall connected to said piston for mounting the piston for rocking movement on said carriage, said wall having a slot therein, a pin mounted on said arm and extending through said slot, a cylinder slidable over said piston and journaled about the axis of said pin for movement relative to said arm, means whereby movement of said cylinder over the piston can be effected by fluid pressure to elevate said arm, and locking means for holding said arm in an elevated position.

13. A lift comprising a carriage, a lifting arm movably connected to said carriage, a piston, means including a supporting wall connected to said piston for mounting the piston for rocking movement on said carriage, said wall having a slot therein, a pin mounted on said arm and extending through said slot, a cylinder slidable over said piston and journaled about the axis of said pin for movement relative to said arm, means whereby movement of said cylinder over the piston can be effected by fluid pressure to elevate said arm, and automatic locking means on said carriage for holding said arm in any one of a plurality of elevated positions.

14. A lift comprising a carriage, a lifting arm movably connected to said carriage adjacent an end of said carriage, a piston mounted for rocking movement on said carriage adjacent the point of connection of the lifting arm to said carriage, the head of said piston being positioned above said arm, a cylinder slidable over said piston and movably connected adjacent the lower end thereof to said arm, means whereby movement of said cylinder on the piston can be effected by fluid pressure to elevate said arm, and locking means for holding said arm in an elevated position.

15. A lift comprising a frame, a lifting arm part movably connected to said frame, a support part for the object to be lifted positioned adjacent the free end of said arm part, one of said parts having a mounting member and the other of said parts having an aperture through which said mounting member passes, said aperture being sufficiently large to allow movement of said support part relative to said arm part, and means for elevating said arm part.

16. A pneumatic lift comprising a frame, a lifting arm movably connected to said frame, a support for the object to be lifted positioned adjacent the free end of said arm and extending transversely thereof, spaced members for holding the object to be lifted and positioned adjacent the ends of said support, means for mounting said support for transverse movement relative to said arm, and pneumatic means between the frame and the arm for elevating the arm.

17. A lift comprising a frame, a lifting arm part movably connected to said frame, a support part for the object to be lifted positioned adjacent the free end of said arm part, one of said parts having a mounting member and the other of said parts having an aperture through which said mounting member passes, said aperture being sufficiently large to allow movement of said support part relative to said arm part, a cross member on said arm part against which the support part engages, and means for elevating said arm part.

18. An air lift comprising a frame, a lifting arm movably connected to said frame, a cylinder member, a piston member in said cylinder member and mounted for slidable movement relative thereto, one of said members being mounted for rocking movement on said frame, the other of said members being connected to said arm by means including a pin, valve means on said cylinder member for detachable connection to an exterior source of air pressure whereby air can be introduced into the cylinder to effect lifting of said arm and whereby air can be allowed to escape from the cylinder into the atmosphere to allow lowering of said arm, a ratchet mechanism movably mounted on said frame, and means for automatically urging said ratchet mechanism into engagement with said pin when the arm is being elevated to prevent accidental lowering of said arm.

ALEXIS JACKSON.
OSCAR L. TENNANT.